3,677,691
NONTOXIC DYES IN POLYGLYCEROL FATTY ACID ESTER AND GLYCOL OR GLYCERINE AND ITS MIXTURE THEREIN
Louis Koch, Yonkers, N.Y., assignor to H. Kohnstamm & Co., Inc., New York, N.Y.
No Drawing. Filed Sept. 24, 1968, Ser. No. 762,150
Int. Cl. D06p 3/10
U.S. Cl. 8—41                                   13 Claims

ABSTRACT OF THE DISCLOSURE

A method for the conversion of water soluble color additives to oil soluble color compositions. The method comprises:
(a) dissolving a water soluble color additive to be converted in a solution of a polyhydric alcohol to form a first color solution;
(b) admixing this first color solution with a solution of glycerol fatty acid ester while heating the mixture to a maximum temperature of 150 C.; and
(c) maintaining the ingredients at this temperature for at least 5 minutes with constant agitation of the mixture and cooling to obtain a stable lyophilic color additive composition.

BACKGROUND OF THE INVENTION

Many of the colors previously employed for lending color to cosmetics, pharmaceuticals and food products have been only provisionally accepted for safe use by the government agencies which control the use and application of such materials. Other oil soluble organic color compositions for use in cosmetics and drugs have been greatly restricted in their use, amounts and applications for reasons of efficacy and safety under increasingly strict government regulation of color additives. In view of the fact that available oil soluble color compositions which are approved by the Food and Drug Administration are being drastically reduced in number, it has become important for manufacturers of dyes and color additives to investigate the possibility of conversion of generally established nontoxic water soluble, oil insoluble dyes and pigments to a lyophilic state. Various attempts have been made in the past to modify water soluble dyestuffs by treating them with anionic, cationic, or non-ionic surfactants to in effect create an emulsion system or chemical complex which gave the outward appearance of being soluble in oil. An example of this effort is the recent attempts at the reaction of anionic water soluble F.D.&C. colors with cationic agents such as stearyl dimethylbenzyl ammonium chloride or N(lauroyl colaminoformylmethyl) pyridinium chloride or various ethoxylated primary amines. Still other researchers have tried to use the principle of co-solvency and thereby have attempted to create water soluble dyestuff solutions with a co-solvent for the dye and for the oil which solution would be miscible also in an oily medium. Particularly, as it related to mineral oil, this approach was unsuccessful as have been all other efforts.

The standard of reference with respect to solubility of color solutions in an oil base has as its minimum requirement of course that such color solutions must be colormetrically and visually observed as clear liquids having sufficient stability to remain in this condition at least for 30 days. A number of apparently oil soluble dye solutions fail this requirement upon standing because of the eventual development of a turbidity or else development of a minute flocculate material therein which indicates that the liquid is not a true solution but rather merely an unstable colloidal dispersion.

An early Pat. No. 1,877,748 to Dove discloses the preparation of a dye solution which is rendered soluble in other media than water by the addition of a member of the group consisting of ethylene glycols and alkyl ethers of the ethylene glycols which are described as maintaining the dye in a stable condition in a non-aqueous solvent. The patentee, however, indicates that the non-aqueous medium to which he is referring is a medium such as methyl alcohol or benzene, not mineral or vegetable oils. A later patent to Schlack No. 1,953,438 discloses a process for the use of phosphatides such as lecithin as a means of introducing dyestuffs into oils or oily solutions without effecting a separation of the dyestuff from the oily medium to which it is added. Since lecithin is a known emulsifying agent, what is occurring here is the creation of an emulsion of the oil insoluble, water soluble dye in the oil with the assistance of the lecithin to generate stability in the system. While this technique is useful for some purposes, it does not generate a true solution of the color additive in the oleaginous vehicle such as mineral oil which is the most difficult of the oils to color and also the most widely used oil in varied applications.

A recent paper published in 1961 by Goldenberg, O'Leary and Ziskin entitled "Use of Water Soluble Certified Colors in Oily Media" describes research work involving attempts at introducing color additives into various oleaginous liquids by means of the use of co-solvents compatible with the dye and the oil in an effort to induce the solubilization of the dye in the oil. In addition to this, efforts were made to acidify various sulfonated dyes to render them oil soluble without success. Particularly it was found for example that using co-solvents, water soluble dye solutions could be introduced into certain oily liquids such as isopropyl myristate but not into mineral oil. Up to the present time, therefore, all prior attempts to introduce water soluble dyes such as F.D.&C. Red #3 (erythrosin) dye into mineral oil have been unsuccessful. Prior to the advent of the present discovery, therefore, there existed no practical way to convert the large number of available water soluble color additives to oil soluble color additives.

It is an object of the present invention, therefore, to disclose a simple and highly efficient technique for the rapid conversion of water soluble dyestuffs into lyophilic colors which are readily dissolved in various oils.

It is a further object of the invention to describe an oil soluble color additive which comprises the complexion product of a water soluble color additive, a polyhydric alcohol such as glycerine and a fatty acid ester of glycerol. Other and more specific objects of the invention will become obvious upon a consideration of the details of the invention as set forth in the following general description of the invention and several embodiments of its practice as described in the several examples presented.

BRIEF DESCRIPTION OF THE INVENTION

The present invention concerns the discovery of a unique method for the conversion of water soluble color additives into oil soluble color additives. The method essentially involves first dissolving the water soluble color additive which is to be converted in a solution of a suitable polyhydric alcohol in concentrations such that the color additive in the first color solution comprises normally between 10 and 50% of the total solution. Since in practice not all of the color additive is converted in the first pass, the stock solution of dye at this point will normally be replenished with additional color additive as it is needed to replace that quantity of the water soluble dye which is removed from the reaction vessel as oil soluble color additive after the completion of the reaction. This first color solution is then placed in a treating vessel with an equal amount of a converting agent which comprises a fatty acid ester of a polyglycerol. An especially efficient converting agent of this type has been shown to be decaglycerol tetraoleate. The mixture of the color additive to be converted, glycerine and the decaglycerol tetraoleate converting agent is heated within 30 minutes to a conversion temperature of 150° C. and held at this temperature for at least 5 minutes. Although applicant does not wish to be bound by any specific mechanism which occurs during this 5 minute interval which transforms the water soluble color into an oil soluble one, it is believed that some not entirely understood conversion action takes place between the dye and the ester to form a new chemical complex or synthesis product which has the former color properties of the original water soluble dyestuff but has acquired in addition a molecular configuration which permits the complex to dissolve fully and go completely into solution in such difficulty soluble oil as ordinary mineral oil. Such well-known water soluble color additives as F.D.&C. Red #3, F.D.&C. Red #2, F.D.&C. Yellow #5 and F.D.&C. Blue #1 have been converted to oil soluble color additives with the application of the technique of the invention.

When carrying out the color conversion method of the invention, it makes no difference whether the water soluble dye is added to the glycerine prime solvent all at one time in a batch operation or alternatively fed into a bath or solution of the dye in the glycerine continuously to maintain a reasonably high concentration of the dye such as at least a 20% concentration of the dye which will of course have to be replenished as the prime solution is recycled from the second or complexing step of the process where a considerable amount of the dye is removed as the newly formed oil soluble product. It is possible with some water soluble dyes to obtain a concentration of as high as 50 to 60% dye in the initial glycerine solution so as to lead to higher final yields of the synthesis product recovered. After complexing with the decaglycerol tetraoleate, I separate the unreacted dye remaining from the synthesis product obtained by such conventional means as a separatory funnel which appears to perform this function quite suitably. It is not clear whether the glycerine component actually takes part in the synthesis between the dye and the decaglycerol tetraoleate ester, but the loss of glycerine in the recovered first or prime solution recycling back from the reaction indicates that the glycerine does participate in the formation of the chemical complex which transforms the oil insoluble dye into an oil soluble product.

It should be pointed out at this point that if one should attempt to dissolve the initial glycerine-dye solution directly into mineral oil without proceeding through the second step of the conversion, there will be obtained a sticky gelatinous insoluble mass which clearly contains incompatible components and does not possess the properties of solubility in even the slightest degree as compared with the product fully processed through both steps of the conversion.

With regard to the first step of the conversion process while it is preferred to use glycerine as the solvent for the water soluble, oil insoluble dyestuffs to be treated, it is possible to substitute in this particular step certain other nontoxic polyhydric alcohols or glycols such as propylene glycol, butylene glycol and the like. The essential characteristic of all of these polyols is that they be capable of dissolving the dyestuff to be converted and yet are not incompatible with the mono-unsaturated fatty acid ester converting agent employed in the second step of the synthesis.

The conversion conditions which have been determined to be optimum for the maximum transformation of the oil insoluble dye or color additive to an oil soluble complex essentially require heating of a mixture of the first color solution of dye with the polyglycerol fatty acid ester complexing agent at a temperature of about 100–150° C. for from 5 to 10 minutes. With the careful control of the reaction, it is possible to obtain a complete conversion of the oil insoluble color additive initially introduced into the vessel where the mixture is heated into an oil soluble complex at the completion of the period of treatment. The preferred operating conditions for such maximum conversion involve heating the synthesis mixture to a temperature of not more than 150° C. for at least 5 minutes with constant agitation of the synthesis mixture. At this time the product removed from the treating vessel has retained all of its color capacity which it formerly held and has acquired the additional property of oil solubility. If the synthesis mixture is heated, however, at a temperature substantially in excess of 150° C. changes in the color properties of the dye may take place since prolonged temperature of this degree can affect the chromophore groups of the dye. Therefore, while it is required that heating of the synthesis mixture is necessary to form the oil soluble complex of the invention, the heating of the mixture should not be excessive regardless of the particular structure of the dyestuff undergoing conversion. It is notable that no catalyst, accelerator, promoter or other agents are needed in this synthesis step to enhance the final yield of oil soluble products.

Concerning the relative proportions of the glycerine-dye solution to the glycerol fatty acid ester converting agent, it has been found that the conversion reaction proceeds satisfactorily when almost any amount of each ingredient is introduced into a treating vessel and heated to the conversion conditions of the time and temperature. In general, therefore, the relative proportions of both the polyglycerol fatty acid ester ingredient and the glycerine-dyestuff ingredient can vary greatly in the order of 90% of one to 10% of the other or vice versa. The relative amounts of the two ingredients will to some extent vary with the particular water soluble dye being converted as well as the particular unsaturated fatty acid ester being employed as the converting agent.

The preferred glycerol unsaturated fatty acid ester employed as the converting agent has been the compound decaglycerol tetraoleate which gives extremely high yields of oil soluble material with a large number of water soluble, oil insoluble dyestuffs in such carriers as glycerine. However, one may employ other fatty acid-polyglycerol esters such as those formed by reacting polyglycerols with other of the unsaturated fatty acids, ricinoleic acid, linoleic acid, behenic acid and other unsaturated aliphatic higher fatty acids which are characterized by the general formula:

$$C_nH_{2n-1}—COOH$$

and $$C_nH_{2n-3}—COOH$$

where $n$ is a whole number from about 12 to 22, which compositions are typified by having a degree of unsaturation which renders the compounds capable of association with alcohols to form esters of various types. The particular polyglycerol esters which have shown unexpected conversion properties appear to work best when formed by reaction with unsaturated fatty acids such as oleic acid or linoleic acid. It is within the concept of the invention, however, that those saturated higher fatty acids such as stearic acid, palmitic acid, myristic acid, lauric acid and the like would also form esters with the polyglycerol materials indicated to yield ester converting agents capable of utilization in the process of the invention.

As to the polyglycerol portion of the ester composition a polymeric glycerol having a composite of ten oxygen linked monoglycerol units known chemically as decaglycerol has shown outstanding capacity to form certain esters which possess such residual functionality as to enable these to complex with various dyes and alter their solubility characteristics. Decaglycerol itself is soluble in water, alcohol and other polar solvents. It has a consistency ranging from that of thick syrup to putty and comprises material of higher molecular weight and boiling point than ordinary glycerol.

The polyglycerols which are reacted with fatty acids to obtain the functionally active conversion ester employed in the present process are prepared by the polymerization of glycerine under alkaline conditions. The polymerization is controlled to yield a specific average molecular weight for the product. Some of the physical and chemical characteristics of typical polyglycerols are as shown in Table I as follows:

TABLE I

| Compound | Molecular weight | No. of hydroxyl groups | Calculated hydroxyl value | Experimental hydroxyl value | Specific gravity |
|---|---|---|---|---|---|
| Hexaglycerol | 460 | 8 | 970 | 1,010 | 1.24 |
| Decaglycerol | 758 | 12 | 880 | 888 | 1.22 |

Investigation of the polymerization reaction which forms these polymers indicates that the polymerization progresses predominantly in a linear manner with the terminal hydroxyl group forming ether linkages by elimination of water. However, permitting the remaining hydroxyl group to remain in position creates functionally active sites for further reactions of the molecule. When these polymers are reacted with various fatty acids, a series of polyglycerol esters are formed which have the properties indicated in the preceding description.

As an indication of the unexpected nature of the present invention when it is sought to convert water soluble dyes to oil soluble color additives by heating the dye with an ester prepared from commercial fatty acid blends of stearic acid, oleic acid and coconut oil fatty acids and lower polyalcohols such as triglycerols the conversion does not take place. Therefore, the substitution of such conventional esters as triglycerol monostearate, triglycerol monooleate, sorbitan monooleate, and sorbitan monostearate does not form the proper type of chemical complex which has the capacity for solubility in mineral oil. Likewise, the use of a polyol diester of a short chain, i.e. $C_1$ to $C_7$ naturally derived fatty acid is also inadequate to give the unexpected result obtained by the practice of the method of the invention. Therefore, it appears that the characteristics of the ester converting agent are basically that the polyol component be a polyglycerol type preferably of the hexaglycerol, octaglycerol or decaglycerol type and the fatty acid moiety of the ester comprise a higher fatty acid which may be saturated or unsaturated such as oleic acid, linoleic acid, stearic acid, lauric acid and the like.

It should be pointed out that the process operates best from a practical standpoint with the constant input of heat and under constant agitation since the ester converting agents are themselves physically rather viscous materials and to guarantee the intimacy of contact between the ingredients the system functions best under the influence of heat and movement of the components constantly until such time as the product is obtained.

The oil soluble dyes obtained as a result of the operation of the present process are nontoxic color additives which have a multitude of uses in foods, drugs and cosmetics. For example, the oil soluble color additives may be incorporated as an edible dyestuff for such food products as mayonnaise, salad dressing, salad oil and other products which have a substantial quantity of oil as a component or as a base. In the cosmetics application, they are employed as color agents for toiletry items such as cold cream, lotion, face cream, deodorant, hand cream, soap and the like. In the pharmaceutical area, our nontoxic color additives would be added to pharmaceutical preparations such as vitamin formulations which have an oil base, antibiotic preparations, cough medicines, various topical salves and jellies, sunburn ointments and the like which require the use of coloring agents. The following specific examples set forth the preferred mode of manufacture of the novel lyophilic color additives of the invention. They also serve to illustrate in detail how one would convert a water soluble, oil insoluble nontoxic color additive to an oil soluble color additive. Since the concept involved in this invention is much broader than the illustrative example of its practice, the scope and extent of the monopoly created may only be determined by reference to the several claims which define the invention.

EXAMPLE I 100 grams of a 20% solution of water soluble, oil insoluble F.D. & C. Red #3 color additive in glycerine was admixed with 100 grams of a solution of the ester decaglycerol tetraoleate which had been stirred and heated to 150° C. The mixture of the two solutions were held at a temperature of 150° C. for at least 5 minutes at which time they were slowly cooled. The reaction mixture was transferred to a separatory funnel to effect a separation of the product obtained into two phases. The upper layer or phase contains the oil soluble dyestuff in high yield and is separated and retained. The lower phase is returned to the treating vessel for the addition of other feed materials and subsequent reprocessing in a continuous treatment cycle. The complex formed as a result of the treatment supplies a high yield of oil soluble dyestuff material which will remain colorfast and free of unstabilizing precipitates for an indefinite period of time.

EXAMPLE II 100 grams of a 20% solution of a water soluble, oil insoluble F.D.&C. Red #3 color additive in propylene glycol may be admixed with 100 grams of a solution of the ester material hexaglycerol tetraoleate while the mixture is constantly stirred and heated to about 150° C. The mixture of the two solutions should be held at an elevated temperature for at least 5 minutes to enable the complex to form. They are then slowly cooled and any unreacted color additive is separated out for subsequent processing.

The new complex formed as a result of the treatment will be entirely soluble in oil and will also retain its color properties in such a solution.

EXAMPLE III 100 grams of a 20% solution of a water soluble, oil insoluble F.D.&C. Yellow #5 color additive in butylene glycol may be admixed with 100 grams of a solution of the ester material decaglycerol octaoleate while the mixture is constantly stirred and heated to about 150° C. The mixture of the two solutions should be held at an elevated temperature for at least 5 minutes to enable the complex to form. They are then slowly cooled and any unreacted color additive is separated out for subsequent processing.

The new complex formed as a result of the treatment will be entirely soluble in oil and will also retain its color properties in such a solution.

COMPARATIVE EXAMPLES

EXAMPLE IV (A) 100 grams of a 20% solution of a water soluble, oil insoluble F.D.&C. Yellow #5 color additive in glycerine was prepared in a manner similar to the preceding example.

An attempt was made to add this solution to an equal amount of a solution of a polyglycol ester solvent which comprised a triglyceride ester of coconut oil fatty acid. The first glycerine solution would not dissolve in the solution of the ester at room temperature despite constant agitation.

The mixture was heated to 150° C. to assist in solubilization and held at this level for 5 minutes with still a failure of the liquids to dissolve in one another.

(B) In a similar manner a polyol diester of lauric acid commercially known as Neobee M-20 was also evaluated by substituting it for the triglyceride ester. This ester of a short chain fatty acid was also incompatible with the glycerine solution of water soluble color additive.

EXAMPLE V

A solution of 100 grams of a water soluble F.D.&C. Yellow #5 color additive in glycerine was prepared as illustrated in Example I.

A solution of the ester sorbitan monooleate was also prepared and the two solutions mixed together with rapid stirring first at room temperature then by heating the mixture to 150° C. and holding at that temperature for 5 minutes while constantly agitating the mixture.

The result was a color precipitation in the mixture which demonstrated some yellowness in the monooleate layer of the mixture which did not satisfactorily indicate dispersal of the color additive in the mitxure.

It can be concluded from these results that not all polyglycol esters will function satisfactorily in the present process despite the fact that the mixture is heated to induce complex formation.

What is claimed is:

1. A method for conversion of water soluble color additives into oil soluble color additives which comprises:
  (a) dissolving a nontoxic F.D.&C. or D.&C. water soluble dye to be treated in a nonaqueous solution of a nontoxic, edible short chain alkylene glycol or glycerine in which the dye is soluble to form a first color solution;
  (b) admixing this first non-aqueous color solution with a polyglycerol higher fatty acid ester while heating the mixture at a temperature of about 100 to 150° C.; and
  (c) maintaining reaction of the ingredients at the elevated temperature for at least 5 minutes with constant agitation of the mixture and cooling to obtain a stable lypophilic color additive composition.

2. A method according to claim 1 wherein the first color solution prepared in step (a) is admixed with an equal amount of a polyglycerol higher fatty acid ester.

3. A method according to claim 1 wherein the polyglycerol higher fatty acid ester of step (b) is an ester of oleic acid.

4. A method according to claim 1 wherein the polyglycerol higher fatty acid ester of step (b) is a decaglycerol fatty acid ester.

5. A method according to claim 1 wherein the polyglycerol higher fatty acid ester of step (b) is a decaglycerol ester of oleic acid.

6. A method according to claim 1 wherein the polyglycerol higher fatty acid ester of step (b) is a decaglycerol tetraoleate.

7. A method according to claim 1 wherein the polyhydric alcohol employed in step (a) is glycerine and the polyglycerol higher fatty acid ester employed in step (b) is decaglycerol tetraoleate.

8. A method according to claim 1 wherein the color additive of step (a) is F.D.&C. Red #3 erythrogin dye.

9. A method according to claim 1 wherein the color additive of step (a) is F.D.&C. Yellow #5 dye.

10. An edible, non-toxic oil soluble color additive for cosmetics and foods which consists of a complex of a water soluble, oil insoluble, non-toxic F.D.&C. or D.&C. organic dye, a nontoxic, edible short chain alkylene glycol or glycerine in which the dye is soluble and a polyglycerol higher fatty acid ester prepared according to the method of claim 1.

11. An oil soluble color additive according to claim 10 wherein the water soluble organic dye reactant is F.D.&C. Red #3.

12. An oil soluble color additive according to claim 10 wherein the water soluble organic dye reactant is F.D.&C. Yellow #5.

13. An oil soluble color additive according to claim 10 wherein the polyglycerol higher fatty acid ester reactant is decaglycerol tetraoleate.

References Cited

UNITED STATES PATENTS

| | | | |
|---|---|---|---|
| 2,209,902 | 7/1940 | Ralston | 260—208 |
| 2,392,158 | 1/1946 | Lacey et al. | 260—208 UX |
| 3,035,923 | 5/1962 | Geisler | 99—148 |
| 3,351,531 | 11/1967 | Noznick et al. | 99—148 X |
| 3,489,573 | 1/1970 | Brankamp | 99—148 |
| 3,162,541 | 12/1964 | Battesta | 99—148 |

OTHER REFERENCES

Ballery: "Industrial 0.1 and Fat Product," 1951, pp. 800, 807 and 808, published by Interscience Pub. Corp., 1951.

Fierz-David et al.: Fundamental Process of Dye Chemistry, pp. 31 and 32, 258–259, published 1949, by Interscience Pub. Corp.

Vickerstaff: The Physical Chemistry of Dyeing, pp. 103, 111–113, published by Interscience Pub. Corp.

Swern et al.: Bailey's Industrial Oil and Fat Products, pp. 369–373.

DONALD LEVY, Primary Examiner

U.S. Cl. X.R.

8—92; 99—148; 260—208; 424—63